(12) United States Patent
Li et al.

(10) Patent No.: US 10,357,100 B2
(45) Date of Patent: Jul. 23, 2019

(54) DEVICE RETAINING MECHANISM (71) Applicant: Hand Held Products, Inc., Fort Mill, SC (US)

(72) Inventors: Beck Li, Suzhou (CN); Carl Ma, Suzhou (CN); Brad McDermott, Hiawatha, IA (US); Neil Mo, Suzhou (CN)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 16/000,213

(22) Filed: Jun. 5, 2018

(65) Prior Publication Data
US 2019/0014890 A1    Jan. 17, 2019

(30) Foreign Application Priority Data

Jul. 17, 2017    (CN) ...................... 2017 2 0864766 U (51) Int. Cl.
*A45F 5/00* (2006.01)
*A45C 11/00* (2006.01)
*F16B 5/06* (2006.01)

(52) U.S. Cl.
CPC ................ *A45F 5/00* (2013.01); *A45C 11/00* (2013.01); *F16B 5/0621* (2013.01);
(Continued)

(58) Field of Classification Search
CPC ................ A45F 5/00; A45F 2200/0508; A45F 2200/0516; A45F 2200/0525;
(Continued)

(56) References Cited

U.S. PATENT DOCUMENTS 5,825,874 A * 10/1998 Humphreys ........ B60R 11/0241
379/446
5,888,087 A    12/1999 Hanson et al.
(Continued)

FOREIGN PATENT DOCUMENTS

WO    2013/171367 A1    11/2013

OTHER PUBLICATIONS

Symbol Technologies, Inc., Zebra Technologies MC55 TRG5500 Trigger Handle User Guide, 2015 Copyright, 2 pages, https://www.zebra.com/content/dam/zebra_new_ia/en-us/manuals/mobile-computers/mc55-trg5500-trigger-handle-user-guide-en-us.pdf, Sep. 26, 2018.
(Continued)

*Primary Examiner* — Dean J Kramer
(74) *Attorney, Agent, or Firm* — Alston & Bird LLP (57) ABSTRACT

A locking arrangement for retaining a device to a housing. An example locking arrangement comprises a latch, a clip, and a retaining pin affixed to the clip. The at least one latch (a) comprises a latch engagement structure and (b) is moveable between a first position and a second position. The clip (a) comprises at least one clip engagement structure and (b) is moveable between a released position and a locked position when the latch is in the second position. When the latch is in the first position and the clip is in the locked position, the latch engagement structure engages the clip engagement structure, such that the locked position is configured to cause the retaining pin to engage the device. When clip is in the released position, the latch engagement structure does not engage the clip engagement structure and the retaining pin does not engage the device.

20 Claims, 8 Drawing Sheets

(52) U.S. Cl.
CPC ... *A45C 2011/002* (2013.01); *A45C 2011/003* (2013.01); *A45F 2200/0508* (2013.01); *A45F 2200/0516* (2013.01); *A45F 2200/0525* (2013.01)

(58) Field of Classification Search
CPC ... F16B 5/0621; H04B 1/3888; H05K 5/0221; A45C 11/00; A45C 2011/002; A45C 2011/003
USPC .......................................... 294/145, 165, 166
See application file for complete search history.

(56) References Cited

U.S. PATENT DOCUMENTS

| | | | | |
|---|---|---|---|---|
| 6,185,302 | B1* | 2/2001 | Rytkonen | B60R 11/0241 379/446 |
| 6,438,229 | B1* | 8/2002 | Overy | H02J 7/0044 379/446 |
| 6,726,070 | B2* | 4/2004 | Lautner | A44C 5/0007 224/221 |
| 6,848,662 | B2 | 2/2005 | Paramonoff et al. | |
| 7,887,841 | B2 | 2/2011 | Baichwal et al. | |
| 7,920,905 | B2* | 4/2011 | Bury | B60R 11/0241 379/445 |
| 8,627,953 | B1 | 1/2014 | Yeo | |
| 8,899,457 | B1* | 12/2014 | Maus | A45F 5/021 224/663 |
| 9,044,330 | B2* | 6/2015 | Chavarria | A61F 2/40 |
| 9,388,939 | B2* | 7/2016 | Girault | G06F 1/1632 |
| 2002/0083558 | A1 | 7/2002 | Tsou | |
| 2002/0158096 | A1* | 10/2002 | Wang | A45F 5/02 224/271 |
| 2005/0135603 | A1 | 6/2005 | Stanford | |

OTHER PUBLICATIONS

Motorola, Motorola MC55/MC65 Accessories Guide (Trigger Handle TRG5500-100R), 2010 Copyright, 6 pages. https://webshop.opalbv.com/OpalDownloads/catalog/parts/Motorola/MC55/Brochuremc5565.pdf, Sep. 26, 2018.

European search report dated Nov. 14, 2018 for EP Application No. 18175580.

European search opinion dated Nov. 14, 2018 for EP Application No. 18175580.

* cited by examiner

DEVICE RETAINING MECHANISM

CROSS-REFERENCE TO RELATED APPLICATIONS

This application claims priority to Chinese Utility Model Application CN 201720864766.3, filed Jul. 17, 2017, the content of which is hereby incorporated herein in its entirety.

BACKGROUND

Over past few decades, use of handheld devices for various purposes has been dramatically increased. Handheld devices like, smartphones, PDA's, encoded information readers, Bar code scanners, RFID readers, are more prominently used nowadays in multiple working environments such as, storage units, inventories, warehouses, manufacturing units, logistic delivery centers, retail outlets, and in other service areas for multiple purposes. For instance, many businesses are now utilizing the handheld devices, such as bar code scanners, RFID readers, QR code readers and other similar indicia reading devices for tracking and monitoring various commodities in such working environments and also for managing work tasks performed in such fields of operation. Generally, in some areas where the handheld devices provide assistance during operations, these handheld devices are portable, such that an operator working in the field of operation may carry the handheld device while he is performing various operations. While in some other areas, the handheld devices may be affixed at a location, such as at a point-of-sale for handling standby operations. Typically, these handheld devices are designed to be compact, lightweight, and rugged in structure for withstanding any mishandling of the devices while the operators move within the field of operation during use of the handheld device. Often to gain a competitive advantage amongst competitors, many manufactures of such handheld devices provide along with the handheld devices, holding units such as adapters, cradles, or handles for docking and retaining and securing these handheld devices during an operation.

BRIEF SUMMARY

The present subject matter relates to a device retaining mechanism for retaining a device, such as a hand-held computing entity, mobile computing entity, wearable computing entity, mobile phone, smartphone, tablet, phablet, cordless telephone, personal digital assistant (PDA), tablet, phablet, media player, media recorder (e.g., portable camera, video camera, audio recorder, and/or the like), e-book reader, encoded information reading terminal, barcode scanner, RFID reader, specialized computing terminal, and/or the like. In accordance with an example embodiment, the device retaining mechanism or the device retaining structure comprises, a housing and a clip and latch arrangement. The housing encompasses or engages the device into the device retaining mechanism by operation of the clip and latch arrangement disposed in the housing. In an exemplary embodiment, the housing includes a clip that may be disposed in part within the housing and one or more latches that are operably connected to the housing. The clip also includes at least one retaining pin affixed to the clip for engaging the device so as to retain the device into the device retaining mechanism.

In accordance with an example embodiment, the clip is operable to be moved between a released position and a locked position, by pushing the clip toward the device, such that in the locked position of the clip, the retaining pin engages with the device. Also, the latches are rotatable and/or pivotable and can be moved back and forth, between a first position and a second position, for engaging and disengaging the device from the device retaining mechanism. Typically, the latches are movable between two positions, i.e. a first position (initial position of latches when the latches are not pressed) and a second position (while the latches are being pressed) by means of a latch torsion spring disposed over a latch pin of the latches. According to various example embodiments, the movement of the clip and the rotation of the latches are interlinked to each other. For instance, as the clip is pushed upwards towards the device placed on and/or in the device retaining structure, the retaining pin engages the device. Simultaneously, the movement of the clip causes the latches to rotate and/or and a latch engagement structure of the latches engages with clip engagement structure of the clip, thereby securing the clip into a locked position. Accordingly, the device gets engaged with and/or secured into and/or onto the device retaining mechanism in the example embodiment. In an example embodiment, as at least a portion of the one or more latches are pressed inwardly into the housing by a user, the latch engagement structure disengages with the clip engagement structure and the clip is released. For example, to release the clip such that the clip may move from the locked position to a released position, a user may press on at least a portion of each of the one or more latches to cause the latches to rotate and/or pivot from the first position to the second position. When the latches are in the second position, the latched engagement structure disengages the clip engagement structure. When the clip is released, the clip moves away from the device due to a force applied thereon by a push spring and thereby causes the retaining pin to disengage from the device. Accordingly, the device gets disengaged from the device retaining mechanism, in an example embodiment.

In accordance with an example embodiment, when the latch is in the first position and the clip is in the locked position the clip is configured to engage the device via one or more retaining pins, thereby securing the device into and/or onto the device retaining mechanism. When the clip is in the released position, the retaining pin does not engage the device, thereby allowing the device to be removed from the device retaining mechanism.

In accordance with an aspect of the present invention, a device retaining mechanism is provided. The device retaining mechanism is configured for retaining a device therein. In an example embodiment, the device retaining mechanism comprises a housing and at least one latch. The at least one latch is (a) operably connected to the housing, (b) comprises a latch engagement structure, and (c) is moveable between a first position and a second position. The device retaining mechanism further comprises a clip, in an example embodiment. The clip (a) is disposed at least in part within the housing, (b) comprises at least one clip engagement structure, and (c) is moveable between a released position and a locked position when the latch is in the second position. In an example embodiment, the device retaining mechanism further comprises at least one retaining pin affixed to the clip. When the latch is in the first position and the clip is in the locked position, the latch engagement structure engages the clip engagement structure, such that the locked position is configured to cause the retaining pin to engage the device. When the clip is in the released position, the latch engagement structure does not engage the clip engagement structure and the retaining pin does not engage the device.

In accordance with another aspect of the present invention, a locking arrangement is provided. The locking arrangement is for retaining a device to a housing. In an example embodiment, the locking arrangement comprises at least one latch. The at least one latch (a) comprises a latch engagement structure and (b) is moveable between a first position and a second position. The locking arrangement further comprises a clip, in an example embodiment. The clip (a) comprises at least one clip engagement structure and (b) is moveable between a released position and a locked position when the latch is in the second position. In an example embodiment, the locking arrangement further comprises at least one retaining pin affixed to the clip. When the latch is in the first position and the clip is in the locked position, the latch engagement structure engages the clip engagement structure, such that the locked position is configured to cause the retaining pin to engage the device. When the clip is in the released position, the latch engagement structure does not engage the clip engagement structure and the retaining pin does not engage the device.

In accordance with still another aspect of the present invention, a holding unit is provided. In an example embodiment, the holding unit comprises a handle portion and a device retaining mechanism. In an example embodiment, the device retaining mechanism comprises a housing, at least one latch, a clip, and at least one retaining pin affixed to the clip. The at least one latch (a) is operably connected to the housing, (b) comprises a latch engagement structure, and (c) is moveable between a first position and a second position. The clip (a) is disposed at least in part within the housing, (b) comprises a clip engagement structure, and (c) is moveable between a released position and a locked position when the latch is in the second position. When the latch is in the first position and the clip is in the locked position, the latch engagement structure engages the clip engagement structure, such that the locked position is configured to cause the retaining pin to engage the device. When the clip is in the released position, the latch engagement structure does not engage the clip engagement structure and the retaining pin does not engage the device.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF VARIOUS EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like numbers refer to like elements throughout.

Example embodiments of the present invention provide a device securing mechanism for securing a device to an auxiliary component. Example embodiments provide an auxiliary component comprising a device securing mechanism for securing a device thereto. For example, the auxiliary component may be configured to provide a user with a more ergonomic way of holding the device, additional and/or augmented functionality of the device, and/or the like. In an example embodiment, a device is a hand-held computing entity, mobile computing entity, wearable computing entity, mobile phone, smartphone, tablet, phablet, cordless telephone, personal digital assistant (PDA), tablet, phablet, media player, media recorder (e.g., portable camera, video camera, audio recorder, and/or the like), e-book reader, encoded information reading terminal, barcode scanner, RFID reader, specialized computing terminal, and/or the like. In an example embodiment, the auxiliary component is a scan handle. For example, the scan handle may comprise one or more optical elements configured for scanning barcodes, and/or the like.

Exemplary Holding Unit

Figure 1:
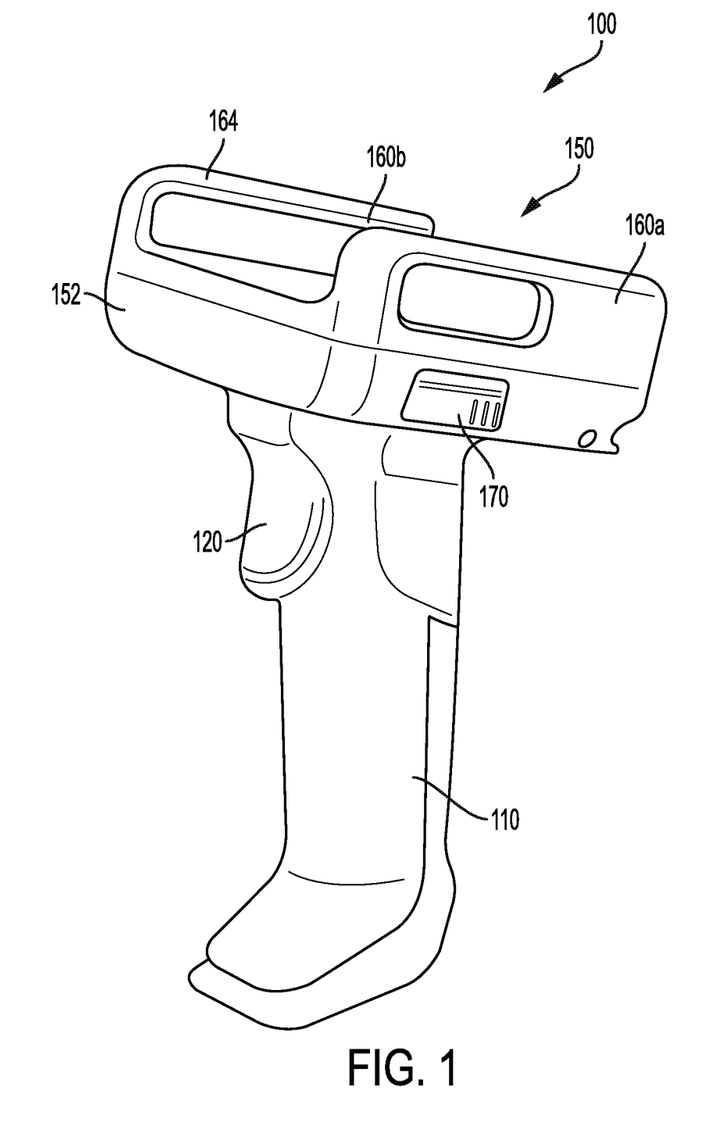
FIG. 1 is a perspective view of a scan handle into which a device retaining mechanism in accordance with an example embodiment of the present invention may be incorporated.

In an example embodiment, the auxiliary component to which a device is to be secured is a holding unit. FIG. 1 illustrates an example holding unit 100, according to an example embodiment. In the illustrated embodiment, the holding unit 100 may comprise a hand grip 110. The hand grip 110 may be configured to provide an ergonomic gripping surface for a user to grip the holding unit 100. In an example embodiment, the holding unit 100 may comprise one or more mounting components in place of and/or in addition to the hand grip 110 for use with non-hand-held applications.

In the illustrated embodiment, the holding unit 100 comprises one or more interactive elements 120. For example, the one or more interactive elements 120 may comprise a trigger button and/or other user pressable, selectable, touchable, and/or the like interactive elements. For example, if the holding unit 100 is a scan handle, the one or more interactive elements 120 may comprise a trigger button that when interacted with by a user causes the device and/or the scan handle 100 to scan a barcode and/or the like. In an example embodiment, the holding unit 100 may comprise one or more optical components and/or one or more processing, memory, and/or communication interface components for providing new and/or augmented functionality to the device and/or for communicating with the device. For example, the holding unit 100 may comprise a connector for providing a wired communication path between the device and the one or more processing, memory, and/or communication interface components of the holding unit 100.

In the illustrated embodiment, the holding unit 100 further comprises a device retaining mechanism 150. In an example embodiment, the device retaining mechanism 150 may be configured for securing a device within the holding unit 100. For example, the device retaining mechanism 150 may comprise a cradle or housing 152 for receiving the device therein, a locking mechanism to retain the device within the housing 152, and one or more latches 170 that may be used to release the device from the holding unit 100. The device retaining mechanism 150 will now be described in more detail below.

Exemplary Device Retaining Mechanism

Figure 2:
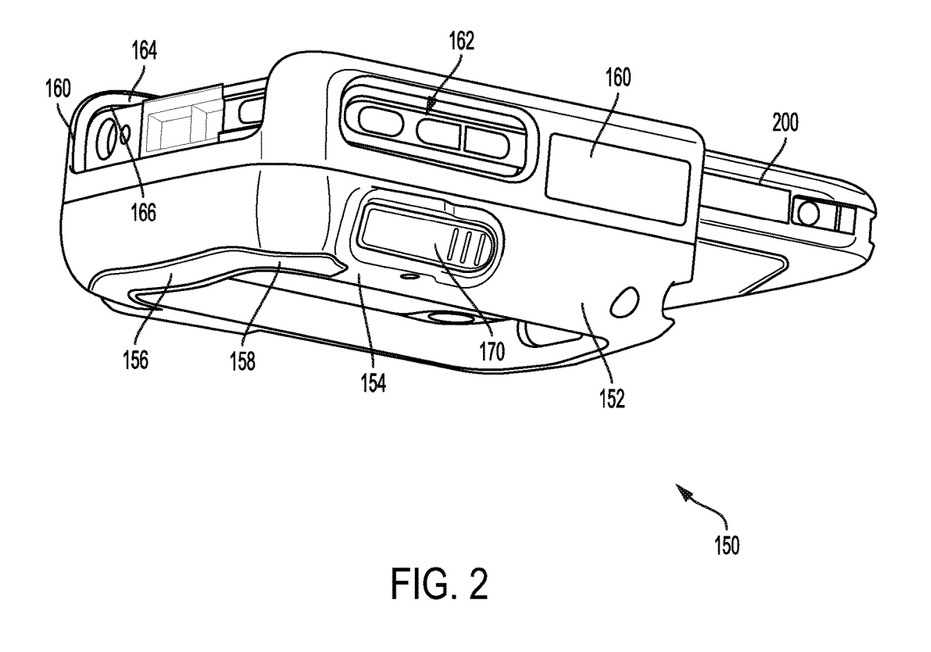
FIG. 2 is a perspective view of a device retaining mechanism, in accordance with an example embodiment of the present invention.

An example embodiment of the device retaining mechanism 150 will now be described with reference to FIGS. 2, 3, 4A, 4B, 5A, and 5b. FIG. 2 illustrates a perspective view of the device retaining mechanism 150 in which a device 200, such as a hand-held computing entity, mobile computing entity, wearable computing entity, mobile phone, smartphone, tablet, phablet, cordless telephone, personal digital assistant (PDA), tablet, phablet, media player, media recorder (e.g., portable camera, video camera, audio recorder, and/or the like), e-book reader, encoded information reading terminal, barcode scanner, RFID reader, specialized computing terminal, and/or the like may be securely retained. As illustrated in the example embodiment, the device retaining mechanism 150 comprises a device retaining mechanism housing 152 that may comprise two sidewalls 160 disposed parallel to each other, at two opposite sides of the device retaining mechanism 150. The two sidewalls 160 may form an enclosure like shape, for securely encompassing the device 200. For example, the two sidewalls 160 may form a cradle for receiving the device 200 therein. In an example embodiment, when engaging the device 200 with the retaining mechanism 150, the device 200 may be moved in a sliding fashion into the enclosure formed by the two sidewalls 160. For example, the device 200 may be slid into the cradle formed by the two sidewalls 160. In an example embodiment, the device 200 may be placed on the device retaining mechanism 150 in any other fashion apart from the sliding way (e.g., using a motion that is not a sliding motion). In an example embodiment, the side walls 160 may in part prevent the device 200 from falling off the device retaining mechanism 150, when the device 200 is positioned on the device retaining mechanism 150 between the two sidewalls 160.

In one example embodiment, the device retaining mechanism 150 comprises the two sidewalls 160, i.e. a first side wall 160a and a second sidewall 160b extending parallel to the first side wall 160a, from the housing 152 of the device retaining mechanism 150. In an example embodiment, each of the two sidewalls 160a and 160b include a sidewall engagement protrusion 164. The structure of a sidewall engagement protrusion 164 may be such that a sidewall engagement protrusion surface 166 of the corresponding sidewall 160 (e.g., 160a, 160b) may extend in a protruded fashion towards the opposite sidewall 160a or 160b of the housing 152. In one example embodiment, the sidewall engagement protrusion 164 with the side wall protrusion engagement surface 166 may be designed such that upon sliding the device 200 between the two sidewalls 160a and 160b the device 200 may get secured in a gripping fashion between the sidewalls 160a and 160b, by the side wall engagement protrusions 164. For example, when a device 200 is inserted into the device retaining mechanism 150, the sidewalls 160a, 160b and the sidewall protrusions 164 may be designed, configured, and/or the like to engage respective surfaces of the device 200. As illustrated in the exemplary embodiment, in some implementations, any of the sidewall 160a or 160b may also comprise of a sidewall access window 162 for providing an access to various interactive elements of the device 200, such as control buttons for controlling the device 200. For instance, the sidewall access window 162 may provide access to the controls for controlling various parameters, such as volume, speaker level, etc. which may be associated with the device 200.

As depicted in the illustrated embodiment, a clip 156 may be disposed in part in the device retaining housing 152, such that a surface of the clip 158 aligns planar to a bottom housing surface 154 of the device retaining housing 152. In an example embodiment, the device retaining housing 152 is affixed to a holding unit of the device 200 comprising a hand grip 110. The clip 156 may be shaped, generally, like a horizontal bar, rectangular prism bar, or a cylindrical bar. In an example embodiment, the clip 156 is generally C-shaped. Alternatively, the clip 156 may be of any shape depending upon various design requirements of the device retaining mechanism 150. The clip 156, in order to lock or engage the device 200 into and/or onto the device retaining mechanism 150, may be pushed by a user (e.g., using his or her hands or fingers) partly or completely into the housing 152. For example, in an example embodiment, the clip 156 is pushed into the housing 152 until a surface 158 of the clip 156 is generally flush with a surface 154 of the device retaining mechanism housing 152. For example, the clip 156 may be movable such that in a locked position of the clip 156, a surface 158 of the clip is flush with a surface 154 of the housing 152 of the device retaining mechanism 150. Accordingly, in an example embodiment, when the clip 156 is in a released position, the clip may extend in part out from the housing 152 of the device retaining mechanism 150. For example, the clip 156 may extend outward from the housing 152 at least in part when the clip 156 is in a released position. Further details of the locked position and the released position of the clip 156 would be provided in forthcoming descriptions of the FIGS. 3, 4A and 4B, hereinafter.

As illustrated in the FIG. 2, the housing 152 of the device retaining mechanism 150 may also provide access to one or more latches 170 that may be operably connected to the device retaining housing 152. For example, each of the one or more latches 170 may be disposed, located, and/or the like on a side of the housing 152. For example, a latch 170 may be disposed, located, and/or the like on the same side of the housing 152 as a sidewall (e.g., 160a, 160b). The latches 170 may be disposed completely or partly in the device retaining housing 152 and may be designed such that each of the latches 170 are operable to be rotated inwardly towards each other in the housing, for unlocking or disengaging the device 200 from the device retaining mechanism 150. For example, a latch 170 may be secured to the housing 152 by a latch pin 174 (see FIG. 3). An axis of the latch pin 174 may be generally parallel to a plane defined by a sidewall 160 (e.g., 160a, 160b) located on the same side of the housing 152. The latch 170 may be secured to the housing 152 such that the latch 170 may be rotated along an arc centered on the latch pin 174. For example, the latch 170 may pivot about the latch pin 174. For example, when a portion of the latch 170 is rotated, pivoted, and/or the like inward toward the housing 152, the latch 170 may release the clip 156, allowing the clip 156 to move into a released position from the locked position.

Figure 3:
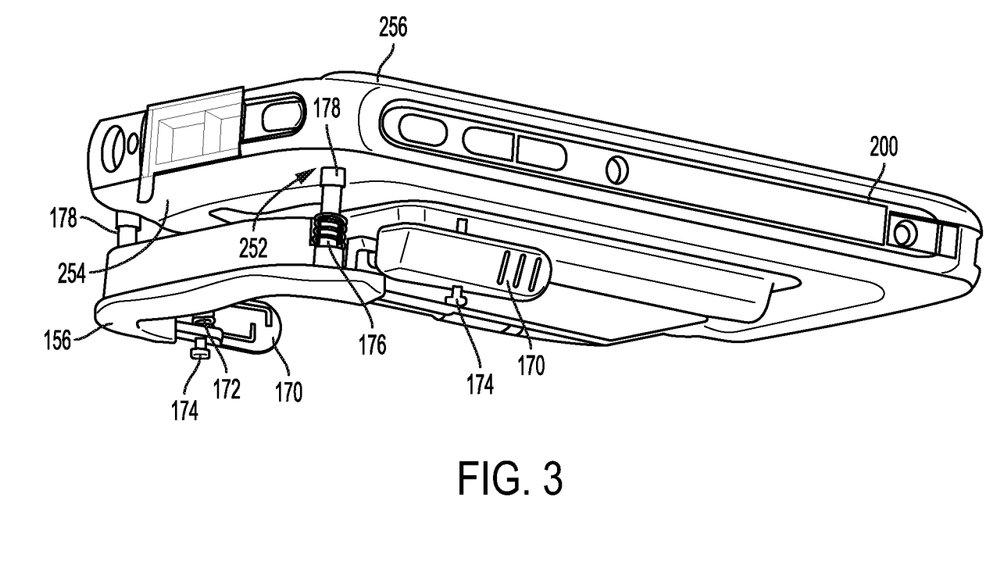
FIG. 3 is a perspective view of a device retaining mechanism, in accordance with an example embodiment of the present invention, with the housing and sidewalls removed.

FIG. 3 illustrates a perspective view of the device retaining mechanism 150 (as described in FIG. 2) with the device retaining housing 152 and sidewalls 160 removed. For example, FIG. 3 illustrates a locking mechanism of the device retaining mechanism 150. In an example embodiment, as described with respect to FIG. 2, the device retaining mechanism 150 comprises one or more (e.g., two) latches 170, such that each latch 170 is being disposed along two sides of the housing 152. As described with reference to FIG. 2, the latches 170 may be operable to be moved (e.g., rotated, pivoted, and/or the like) in the two different positions such as, the first position and the second position. For instance, in an operation, a user may need to press the latches 170 inwardly towards each other in a rotatory fashion, such that the latch 170 moves from a first position, (i.e. a position of the latch 170 just before the user presses the latch) to a second position, (i.e. the position of the latch 170 while it is being pressed). As illustrated in FIG. 3, each latch 170 is operable to be rotated around a respective latch pin 174 that may be disposed and/or secured within the housing 152 and have a latch torsion spring 172 positioned there about. The latch torsion spring 172, disposed about the latch pin 174, biases the corresponding latch 170 back into the first position upon releasing of the pressed latch 170. For example, the torsion spring 172 corresponding to a first latch pin 174 may be configured to bias the latch 170 secured to the first latch pin 174 into the first position. In an example embodiment, when the latch 170 is in the first position, the latch 170 is generally parallel to the edge of the housing 152 in which the latch 170 is disposed. In accordance with the illustrated embodiment, rotation of the latches 170 around the latch pin 174 via the latch torsion spring 172 causes engagement of an end of the latch 170 against a corresponding engagement on the clip 156.

As illustrated in the FIG. 3, engagement of the latches 170 with the clip 156, holds the clip 156 within locked position. For example, when the one or more latches 170 engage the clip 156, the clip 156 is secured into the locked position. Similarly, when the latches 170 are not engaged with the clip 156, the clip 156 can be moved between the locked position and the released position, moved between the released position and the locked position, and/or may be in the released position. The operation of the clip 156 relative to the movement of the latches 170 for engaging and disengaging the device 200 with the device retaining mechanism 150 will now be described in more detail.

As described before, the latches 170 may be in any of the first position or the second position depending upon if the latches 170 are being pressed or not. For example, a torsion spring 172 may bias the corresponding latch 170 into the first position when the latch 170 is not being pressed. When pressed and/or otherwise engaged by a user, the latch 170 may rotate, pivot, and/or the like into the second position. When the user releases the latch 170, the latch may then rotate, pivot, and/or the like to return to the first position due to the force and/or torque applied to the latch 170 by the corresponding torsion spring 172. When the clip 156 is moved from the released position into the locked position, a clip engagement structure 180 may act to momentarily and/or temporarily cause the latch 170 to rotate from the first position to the second position without the user pressing and/or otherwise engaging the latch 170. The latch 170 may then automatically return to the first position due to the force and/or torque applied to the latch 170 by the torsion spring 172.

In accordance with an example embodiment, when the latch 170 is in the first position, the clip 156 can be in one of the locked position or in the released position. When the latch 170 is in the second position, the clip 156 is movable between the locked position and the released position. As illustrated, the clip 156 can be moved into the locked position for engaging the device 200 with the device retaining structure 150.

In accordance with the illustrated embodiment, the clip 156 comprises one or more retaining pins 178. For example, in an example embodiment, one or more retaining pins 178 are affixed to the clip 156. The retaining pins 178 may be configured, utilized, and/or the like for engaging the device 200 so as to secure the device 200 into and/or onto the device retaining mechanism 150. In the illustrated embodiment, a press spring 176 is disposed around each of the one or more retaining pins 178 for enabling movement of the clip 156 with respect to the device 200 and the housing 152. As illustrated in the exemplary embodiment, pressing the clip 156 into the housing 152 and toward the device 200 positioned within the housing 152, compresses the press springs 176 and causes engagement of the device 200 by the one or more retaining pins 178. In an example embodiment, the retaining pins may engage to recessed seats 252 of the device 200. The recessed seats 252 may be like a seat shaped slot located on a bottom surface of the device engagement surface 254 of the device 200. For example, the recessed seats 252 may be a surface, cup, and/or the like recessed into the device engagement surface 254. According to various example embodiments, when the clip 156 is in the locked position the one or more retaining pins 178 are in engagement with the device 200 to secure the device 200 into the device retaining mechanism 150. For instance, while the clip 156 is in the locked position, the one or more retaining pins 178 are engaged with the device 200 (e.g., via the recesses seats 252 and/or the engagement surface 254) and when the clip 156 is in the released position the one or more retaining pins 178 are not engaged with the device 200. In an example embodiment, engagement of the retaining pins 178 with the device 200 may cause a first surface of the device 256 to engage the sidewall engagement protrusion surfaces 166 of the sidewall protrusions 164, thereby further securing the device 200 into the device retaining mechanism 150. Further, as described before, in the locked position of the clip 156, each of the one or more latches 170 is engaged with the clip 156 by means of an engagement structures 190 and 180 of the latch 170 and the clip 156 respectively. Thus, by the way of (a) securing the device 200 within the two sidewall protrusions 164, (b) engaging and disengaging the two retaining pins 178 to the device 200 and (c) the engagement of the latch 170 with the clip 156, the device 200 may be secured into and/or onto and released from the device retaining mechanism 152. The details of latch 170, clip 156 and its corresponding inter-operations in the locked position and unlocked position of the clip 156 are further described in more details with respect to FIGS. 4A, 4B, 5A, and 5B here forth.

Figure 4A:
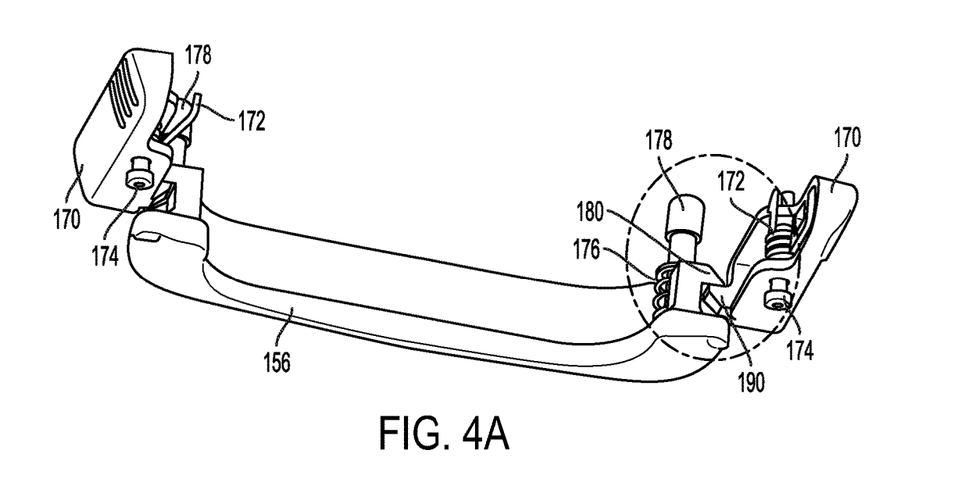
FIG. 4A is a perspective view of a portion of a device retaining mechanism in a locked positioned, in accordance with an example embodiment of the present invention.
Figure 4B:
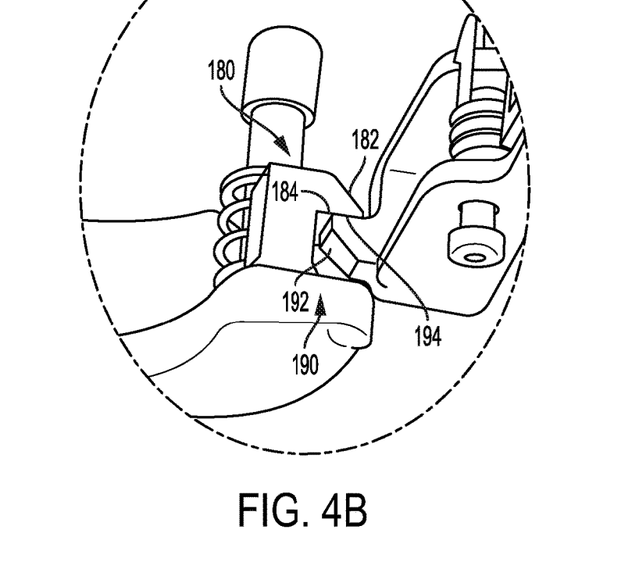
FIG. 4B is a zoomed in view of a portion of FIG. 4A.

FIGS. 4A and 4B illustrate an exemplary embodiment providing a perspective view of the device retaining mechanism 150 in a locked position. In accordance with the illustrated embodiment, the latch 170 of the device retaining mechanism 150 comprises a latch engagement structure 190 having an angled surface 192 and a latch engagement surface 194. Similarly, the clip 156 comprises a clip engagement structure 180 having an angled surface 182 and a clip engagement surface 184. In an example embodiment, the latch engagement surface 194 may be designed for engaging the clip engagement surface 184 of a corresponding clip engagement structure 180 and thereby securing the clip 156 into the locked position while the latches are maintained within the first position. The angled surface 182 of the clip engagement structure 180 and the angled surface 192 of the latch engagement structure 190 are configured such that when the clip 156 is moved from the released position into the locked position, the angled surface 182 presses against and/or engages the angled surface 194 to push the corresponding latch 170 into the second position. When the latch 170 moves into the second position and the angled surface 182, 192 slide past one another, and the corresponding torsion spring 172 causes the latch 170 to return to the first position such that the latch engagement surface 194 engages the clip engagement surface 184. In an example embodiment, the clip 156 may comprise two clip engagement structures 190 disposed on opposite ends of the clip 156, such that each of the clip engagement structure 190 is configured to engage a corresponding latch engagement structure 180 of the one or more (e.g., two) latches 170 disposed on opposite sides of the clip 156. As illustrated, in the locked position of the device retaining mechanism 150, each of the one or more latches 170 engages the clip 156 via the latch engagement structure 190 and the clip engagement structure 180 respectively. In such position, when the latch engagement structure 190 is engaged to the clip engagement structure 180, movement of the clip 156 in and out of the housing 152 is restricted by the engagement of the clip engagement structure 180 with the latch engagement structure 190. In particular, in an example embodiment, the latch 170 rotates, pivots, and/or the like about an axis (e.g., as defined by the latch pin 174) that is generally parallel with the axis along which the clip moves between the locked position and the released position. Thus, the latch 170 rotates in a plane perpendicular to axis along which the clip moves between the locked position and the released position. Further, while the clip 156 is in a locked position, the one or more retaining pins 178 affixed on the clip 156 are engaged with the device 200 placed on the device retaining mechanism 150 thereby causing the device 200 to be retained in and/or on the device retaining mechanism 150.

As illustrated in FIGS. 4A and 4B, the engagement of the latch engagement structure 190 to the clip engagement structure 180 is based on the rotation of the latches while the clip 156 is pushed upwards. For engaging the device 200 placed on the device retaining mechanism 150, the user pushes the clip 156 towards the device 200, thereby causing the clip 156 to move from the released position into the locked position. As the clip 156 is pushed upwards, the latch 170 rotates around the latch pin 174, and causes the latch engagement structure 190 to engage with the clip engagement structure 180 and further causing the one or more retaining pins 178 to engage to the device 200. Thus, when the latch 170 is in the first position and the clip 156 is in the locked position, the latch engagement structure 190 engages with the clip engagement structure 180 thereby causing the one or more retaining pins 178 to engage the device 200.

In an example embodiment, each of the one or more retaining pins 178 has a press spring 176 there about. For example, a press spring 176 may be disposed co-axially with each retaining pin 178. When the clip 156 is in the locked position, each press spring engages the engagement surface of the device 200 and is compressed. When the one or more latches 170 are rotated, pivoted, and/or the like into the second position, the press spring(s) 176 de-compress, causing the clip 156 to move away from the device 200 and into the released position. Thus, when the one or more latches 170 are in the first position and the clip 156 is in the locked position, the press springs 176 are in a compressed state and when the clip 156 is moved into the released position, the press springs 176 are de-compressed. For disengaging the device 200 from the device retaining mechanism 159, pressing the latches 170 inwardly in the second position causes each of the one or more latches 170 to disengage from the clip 156, thereby causing the clip 156 to move from the locked position to the released position due to restoring force caused by the press springs 176 in the decompressed state. Decompression of the press springs 176 causes the one or more retaining pins 178 to disengage from the device 200, allowing the device to be removed from the device retaining mechanism 150. Further, as the pressing of the latch 170 is released or stopped, the latch torsion spring 172 biases the latch 170 back from the second position back into the first position.

Figure 5A:
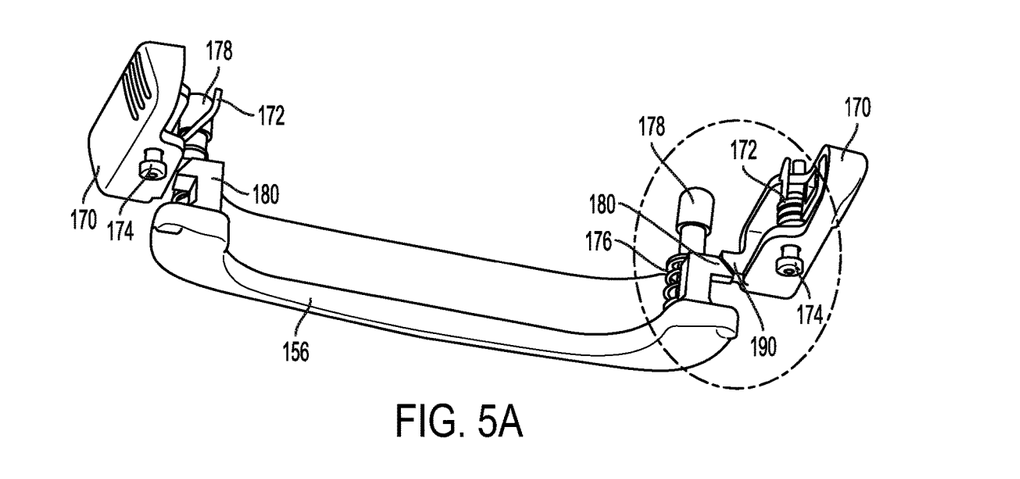
FIG. 5A is a perspective view of a portion of a device retaining mechanism in a released positioned, in accordance with an example embodiment of the present invention.
Figure 5B:
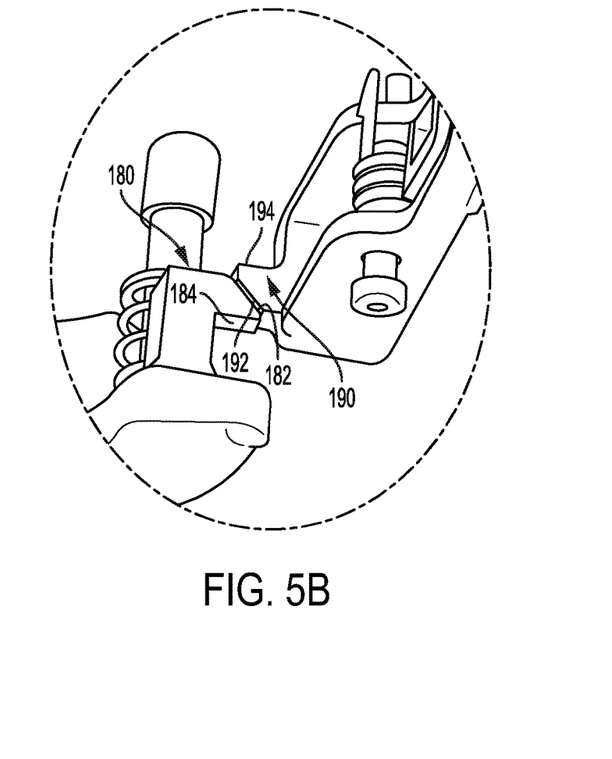
FIG. 5B is a zoomed in view of a portion of FIG. 5A.

FIGS. 5A and 5B provides a perspective view of the device retaining mechanism 150 in a released position. As illustrated in FIGS. 5A and 5B, the latch engagement structure 190 of the device retaining mechanism is disengaged from the clip engagement structure 180. In an example embodiment, in the released position of the clip 156, while the latch engagement structure 190 of the device retaining mechanism is disengaged from the clip engagement structure 180, the angled surface of the latch engagement structure 192 may align up to the angled surface of the clip engagement structure 182. Thus, as the latch 170 is pressed and rotated or pivoted around the latch pin 174, the latch 170 moves to the second position and the clip 156 is released. Further, in the released position of the clip 156, the latch engagement structure 190 does not engage with the clip engagement structure 180. Accordingly, the one or more retaining pins 178 do not engage the device 200, thereby allowing the device 200 to be disengaged and/or removed from the device retaining mechanism 150.

Exemplary Method of Securing a Device to a Holding Unit

Figure 6:
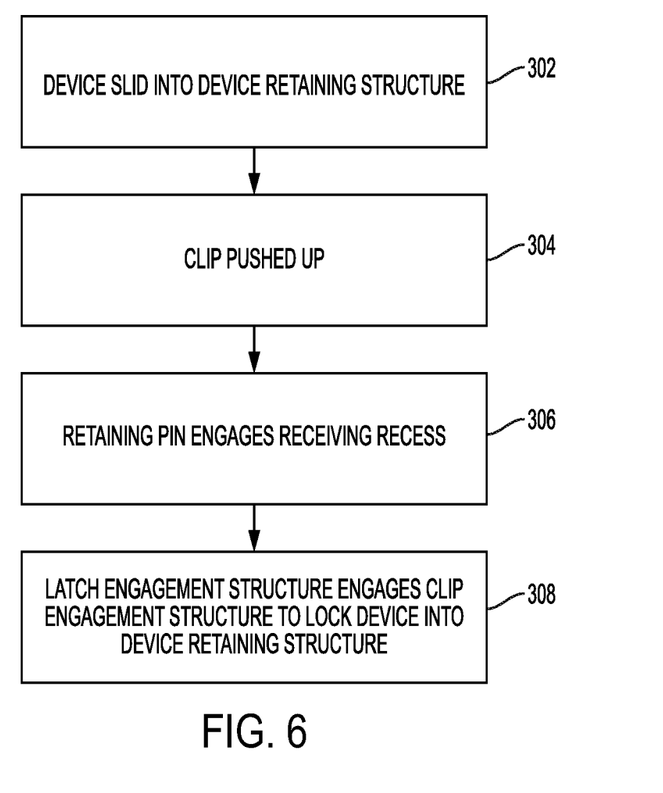
FIG. 6 provides a flowchart illustrating processes and procedures of locking a device into a scan handle, for example, using a device retaining mechanism, in accordance with an example embodiment of the present invention.

FIG. 6 provides a flowchart of various processes and procedures that may be used to secure a device 200 to a holding unit 100. Starting at block 302, a user slides the device 200 into the device retaining structure 150. For example, the device 200 may be a hand-held computing entity, mobile computing entity, wearable computing entity, mobile phone, smartphone, tablet, phablet, cordless telephone, personal digital assistant (PDA), tablet, phablet, media player, media recorder (e.g., portable camera, video camera, audio recorder, and/or the like), e-book reader, encoded information reading terminal, barcode scanner, RFID reader, specialized computing terminal, and/or the like. For example, the user may carry the device 200 in his/her pocket and before starting a work process in a work environment, such as a retail store, inventory, warehouse, and/or the like. The user may slide the device 200 into a device holding unit, such as the device retaining mechanism 150. As the device 200 is slide into the device retaining structure 150, the device 200 may be temporarily secured in the device retaining mechanism 150 by the sidewalls 160 each having sidewall protrusions 164 extending toward the opposite side wall 160. However, merely sliding the device 200 into the device retaining mechanism 150 such that the device 200 is at least in part within the housing 152 may not fixedly secure the device to the holding unit 100. Thus, at block 304, the user pushes the clip 156 toward the device 200 placed in and/or on the device retaining structure 150. Movement of the clip 156 toward the device 200 causes the press spring(s) 176 disposed about the retaining pin(s) 178 to be compressed through engagement with the engagement surface 254 of the device 200. As the clip 156 is pushed upwards, the press springs 176 are compressed around the one or more retaining pins 178 and the latch 170 rotates about the latch pin 174 via the engagement of the angled surfaces 182, 192 into the second position.

As illustrated at block 306, a continued pushing of the clip 156 upwards causes the one or more retaining pins 178 to engage with a receiving recess (e.g., recessed seats 252) on the device 200 and further causes engagement of the latch 170 with the clip 156 by means of the latch engagement surface 194 engaging the clip engagement surface 184 as the latch 170 rotates and/or pivots back into the first position due to the force applied by the torsion spring 172. For example, during the engagement of the latch 170 with the clip 156, the latch engagement surface 194 engages across the clip engagement surface 184 as illustrated in FIGS. 4A and 4B. In one example implementation, engagement of the latch engagement surface 194 and the clip engagement surface 184 and the engagement of the one or more retaining pins 178 with the device 200 may occur simultaneously, in a complementary fashion to each other. While in another example implementation, as illustrated at block 308, the engagement of the latch engagement surface 194 and the clip engagement surface 184 may be followed upon the engagement of the one or more retaining pins 178 with the receiving recess on the device 200. When the latch 170 rotates and/or pivots back into the first position due to the force and/or torque applied by the torsion spring 172, the clip 156 is locked into the locked position and the device 200 is secured within the device retaining mechanism 150.

Exemplary Method of Releasing a Device from a Holding Unit

Figure 7:
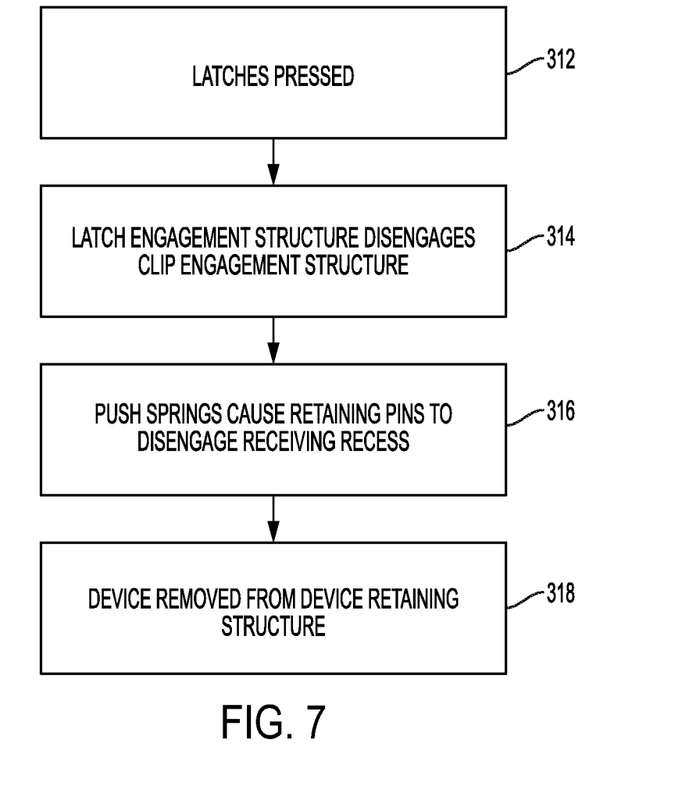
FIG. 7 provides a flowchart illustrating processes and procedures of removing a device from a scan handle, for example, into which the device was retained using a device retaining mechanism, in accordance with an example embodiment of the present invention.

FIG. 7 provides a flowchart of various processes and procedures that may be used to release a device 200 from a holding unit 100. Starting at block 312, a user presses the latches 170 inwardly towards each other. For example, a user may apply a force and/or torque to the one or more latches 170 thereby causing the one or more latches to rotate and/or pivot about the latch pin 174 from a first position to a second position. As the one or more latches 170 are rotated and/or pivoted into the second position, the latch engagement surface 194 disengages the clip engagement surface 184, as indicated by block 314. During the disengagement, as the latch 170 rotates, the latch engagement surface 194 sweeps across the clip engagement surface 184 and eventually disengages from the clip engagement surface 184, such that the angled surface of the latch engagement structure 192 may align with the angled surface of the clip engagement structure 182, as illustrated in FIGS. 5A and 5B. As illustrated in at block 316, disengagement of the latch engagement structure 190 with the clip engagement structure 180 allows the press springs 176 to restore back from the compressed state to the decompressed state, thereby disengaging the one or more retaining pins 178 from the receiving recess (e.g., recessed seats 252) on the device 200. Once the clip 156 is in the released position and the one or more retaining pins 178 are disengaged from the device 200, as illustrated in at block 318, the device 200 may be removed from the device retaining structure 150. For example, once the clip 156 is in the released position, the user may release the latches 170. The latches 170 may rotate and/or pivot back to the first position due to the force and/or torque applied thereto by the corresponding torsion spring 172. The device 200 may be slid out of the housing 152.

Exemplary Device

Figure 8:
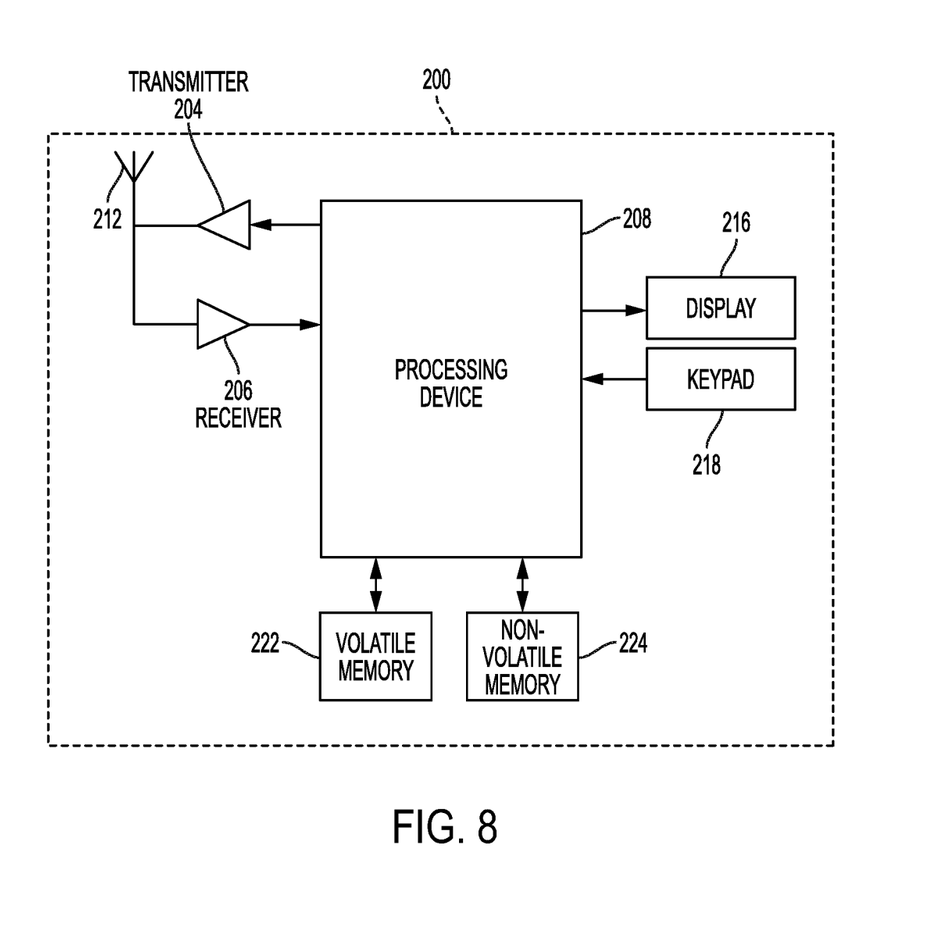
FIG. 8 is a block diagram of an example device that may be retained using a device retaining mechanism, in accordance with an example embodiments of the present invention.

FIG. 8 provides an illustrative schematic representative of an example device 200 that may be secured to a scan handle 100, for example, using a device retaining mechanism 150. In an example embodiment, the device 200 is a mobile computing entity, handheld computing entity, a wearable computing entity (e.g., a smart watch), and/or the like. In an example embodiment, the device 200 may be configured to operate an application through which the device 200 may receive and/or process information/data, signals, communications, and/or the like received from the scan handle via wired or wireless communication. In an example embodiment, the handle portion 100 may be configured to communicate with the device 200 and provide additional functionality or augment a functionality of the device 200. For instance, the handle portion 100 may comprise control buttons or an actuator (e.g., interactive elements 120) for triggering scanning of a coded information via the device 200 and/or the handle portion 100. In another example implementation, the handle 100 may include control buttons for changing a mode of operation of the device 200. In an example embodiment, the device 200 may comprise one or more receiving recesses (e.g., recessed seats 252) in a housing thereof. For example, the receiving recesses (e.g., recessed seats 252) may be configured for receiving one of the retaining pins 178 therein. For example, a retaining pin 178 may engage the device 200 via the receiving recess (e.g., recessed seats 252), in an example embodiment. In one example embodiment, the retaining pin 178 may engage an exterior surface of the device 200 (engagement surface 254).

As shown in FIG. 8, a device 200 can include an antenna 212, a transmitter 204 (e.g., radio), a receiver 206 (e.g., radio), and a processing device 208 that provides signals to and receives signals from the transmitter 204 and receiver 206, respectively. The signals provided to and received from the transmitter 204 and the receiver 206, respectively, may include signaling information/data in accordance with an air interface standard of applicable wireless systems to communicate with various entities, such as server, another device or computing entity 200, and/or the like. In this regard, the device 200 may be capable of operating with one or more air interface standards, communication protocols, modulation types, and access types. More particularly, the device 200 may operate in accordance with any of a number of wireless communication standards and protocols. In a particular embodiment, the device 200 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the device 200 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The device 200 can also download changes, add-ons, and updates, for instance, to its firmware, software (e.g., including executable instructions, applications, program modules), and operating system.

According to one embodiment, the device 200 may include location determining aspects, devices, modules, functionalities, and/or similar words used herein interchangeably. For example, the device 200 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the device's 200 position in connection with a variety of other systems, including cellular towers, Wi-Fi access points, and/or the like. Similarly, the device 200 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The device 200 may also comprise a user interface (that can include a display 216 coupled to a processing device 208) and/or a user input interface (coupled to a processing device 208). For example, the user interface may be an application, browser, user interface, dashboard, webpage, and/or similar words used herein interchangeably executing on and/or accessible via the device 200 to interact with and/or cause display of information. The user input interface can comprise any of a number of devices allowing the device 200 to receive data, such as a keypad 218 (hard or soft), a touch display, voice/speech or motion interfaces, scanners, readers, or other input device. In embodiments including a keypad 218, the keypad 218 can include (or cause display of) the conventional numeric (0-9) and related keys (#, *), and other keys used for operating the device 200 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the device 200 can collect contextual information/data in addition to receiving user input.

The device 200 can also include volatile storage or memory 222 and/or non-volatile storage or memory 224, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the device 200.

In various embodiments, the device retaining mechanism 150 provides various advantages over existing holding units for holding or retaining electronic devices. Various example embodiments of the device retaining mechanism provide a robust way of securing a device, such as a hand-held computing entity, mobile computing entity, wearable computing entity, mobile phone, smartphone, tablet, phablet, cordless telephone, personal digital assistant (PDA), tablet, phablet, media player, media recorder (e.g., portable camera, video camera, audio recorder, and/or the like), e-book reader, encoded information reading terminal, barcode scanner, RFID reader, specialized computing terminal, and/or the like that requires careful handling by operators while using the device in a working environment. Additionally, the holding unit comprising the device retaining mechanism 150 may provide the device 200 with augmented and/or new functionality. Typically, when the devices are used for reading coded information, such as barcodes, RFID tags, or other indicia, the coded information may be generally, located or affixed at any place on commodities placed working environments such as retail-stores, warehouses, and/or the like. In such situations, often the operators have to perform multiple tasks using both of their hands. For example, the operators in some instances use one hand for placing certain commodity items on shelves in the warehouse or to lift up or hold the commodity or item and uses the other hand to scan the barcode affixed to the item. All of such instances requires careful handling of the handheld devices, as any miss-handling may cause damage to the handheld devices. The device retaining mechanism related to the present subject matter provides a reliable and secure way of retaining the handheld devices in such situations.

Conclusion

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A device retaining mechanism configured for retaining a device therein, the device retaining mechanism comprising:

a housing;

at least one latch, the at least one latch (a) operably connected to the housing, (b) comprising a latch engagement structure, and (c) being moveable between a first position and a second position;

a clip, the clip (a) disposed at least in part within the housing, (b) comprising at least one clip engagement structure, and (c) being moveable between a released position and a locked position when the latch is in the second position, and at least one retaining pin affixed to the clip, wherein:

when the latch is in the first position and the clip is in the locked position, the latch engagement structure engages the clip engagement structure, such that the locked position is configured to cause the at least one retaining pin to engage the device, when the clip is in the released position, the latch engagement structure does not engage the clip engagement structure and the at least one retaining pin does not engage the device; and at least one push spring disposed about the at least one retaining pin, the at least one push spring adapted to enable movement of the clip between the released position and the locked position.

2. The device retaining mechanism of claim 1, further comprising:
a first sidewall extending from the housing;
a second sidewall extending from the housing, the second sidewall being on an opposite side of the housing from the first sidewall and being parallel to the first sidewall;
a first sidewall protrusion extending from the first sidewall toward the second sidewall; and
a second sidewall protrusion extending from the second sidewall toward the first sidewall,
wherein when the latch is in the first position and the clip is in the locked position, the engagement of the device by the at least one retaining pin causes the engagement of the device by (a) a first engagement surface of the first sidewall protrusion and (b) a second engagement surface of the second sidewall protrusion.

3. The device retaining mechanism of claim 1, wherein:
when the latch is in the first position and the clip is in the locked position, the at least one push spring is compressed, and
when the latch is moved to the second position, the at least one push spring de-compresses, causing the clip to move to the released position and thereby causing the at least one retaining pin to disengage the device.

4. The device retaining mechanism of claim 3, wherein the at least one retaining pin and at least one push spring comprises two retaining pins and two push springs, each push spring disposed about one of the two retaining pins.

5. The device retaining mechanism of claim 1, further comprising:
at least one latch pin, the latch pin mounting the latch to the housing such that the latch rotates about the latch pin; and at least one torsion spring, the torsion spring disposed about the latch pin and configured to bias the latch into the first position.

6. The device retaining mechanism of claim 5, wherein:
the at least one latch comprises two latches disposed on opposite sides of the housing, the at least one latch pin comprises two latch pins, each latch pin mounting one of the two latches to the housing such that the corresponding latch pin rotates about the latch pin, and
the at least one torsion spring comprises two torsions springs, each torsion spring disposed about one of the two latch pins.

7. The device retaining mechanism of claim 1, wherein the housing is affixed to a holding unit comprising a hand grip.

8. The device retaining mechanism of claim 1, wherein, when the clip is in the locked position, a surface of the clip is generally flush with a surface of the housing.

9. The device retaining mechanism of claim 1, wherein, when the clip is in the released position, the clip extends in part out from the housing.

10. A locking arrangement for retaining a device to a housing, the locking arrangement comprising:
at least one latch, the at least one latch (a) comprising a latch engagement structure and (b) being moveable between a first position and a second position;

a clip, the clip (a) comprising at least one clip engagement structure and (b) being moveable between a released position and a locked position when the latch is in the second position; and
at least one retaining pin affixed to the clip, wherein the latch engagement structure is movable between the first position and the second position, at least, on movement of the clip; wherein:
when the latch is in the first position and the clip is in the locked position, the latch engagement structure engages the clip engagement structure, such that the locked position is configured to cause the at least one retaining pin to engage the device; and
when clip is in the released position, the latch engagement structure does not engage the clip engagement structure and the at least one retaining pin does not engage the device.

11. The locking arrangement of claim 10, further comprising:
at least one push spring, wherein the push spring is disposed about the at least one retaining pin, wherein:
when the latch is in the first position and the clip is in the locked position, the at least one push spring is compressed, and
when the latch is moved to the second position, the at least one push spring de-compresses, causing the clip to move to the released position and thereby causing the at least one retaining pin to disengage the device.

12. The locking arrangement of claim 11, wherein the at least one retaining pin and at least one push spring comprises two retaining pins and two push springs, each push spring disposed about one of the two retaining pins.

13. The locking arrangement of claim 10, further comprising:
at least one latch pin, the latch affixed to the latch pin such that the latch rotates about the latch pin;
at least one torsion spring, the torsion spring disposed about the latch pin and configured to bias the latch into the first position.

14. The locking arrangement of claim 13, wherein:
the at least one latch comprises two latches disposed on opposite sides of the clip, the clip comprises two clip engagement structures disposed on opposite ends of the clip and each clip engagement structure is configured to engage a corresponding latch engagement structure,
the at least one latch pin comprises two latch pins, each latch affixed to one of the two latch pins such that the corresponding latch rotates about the latch pin, and the at least one torsion spring comprises two torsions springs, each torsion spring disposed about one of the two latch pins.

15. A holding unit comprising:
a handle portion; and
a device retaining portion, the device retaining portion comprising:
a housing;
at least one latch, the at least one latch (a) operably connected to the housing, (b) comprising a latch engagement structure, and (c) being moveable between a first position and a second position;
a clip, the clip (a) disposed at least in part within the housing, (b) comprising a clip engagement structure, and (c) being moveable between a released position and a locked position when the latch is in the second position; and
at least one retaining pin affixed to the clip, wherein the latch engagement structure is movable between the first position and the second position, at least, on movement of the clip; wherein:

when the latch is in the first position and the clip is in the locked position, the latch engagement structure engages the clip engagement structure, such that the locked position is configured to cause the at least one retaining pin to engage the device; and when the clip is in the released position, the latch engagement structure does not engage the clip engagement structure and the at least one retaining pin does not engage the device.

16. The holding unit of claim 15, wherein the handle portion is configured to communicate with the device.

17. The holding unit of claim 15, wherein the handle portion is configured to provide additional functionality or augment the functionality of the device.

18. The holding unit of claim 15, further comprising:
a first sidewall extending from the housing;
a second sidewall extending from the housing, the second sidewall being on an opposite side of the housing from the first sidewall and being parallel to the first sidewall;
a first sidewall protrusion extending from the first sidewall toward the second sidewall; and
a second sidewall protrusion extending from the second sidewall toward the first sidewall, wherein when the latch is in the first position and the clip is in the locked position, the engagement of the device by the at least one retaining pin causes the engagement of the device by (a) a first engagement surface of the first sidewall protrusion and (b) a second engagement surface of the second sidewall protrusion.

19. The holding unit of claim 15, further comprising:
at least one push spring, wherein the push spring is disposed about the at least one retaining pin, wherein:
when the latch is in the first position and the clip is in the locked position, the at least one push spring is compressed, and
when the latch is moved to the second position, the at least one push spring de-compresses, causing the clip to move to the released position and thereby causing the at least one retaining pin to disengage the device.

20. The holding unit of claim 15, further comprising:
at least one latch pin, the latch pin mounting the latch to the housing such that the latch rotates about the latch pin; and
at least one torsion spring, the torsion spring disposed about the latch pin and configured to bias the latch into the first position.

* * * * *